Figure 1:
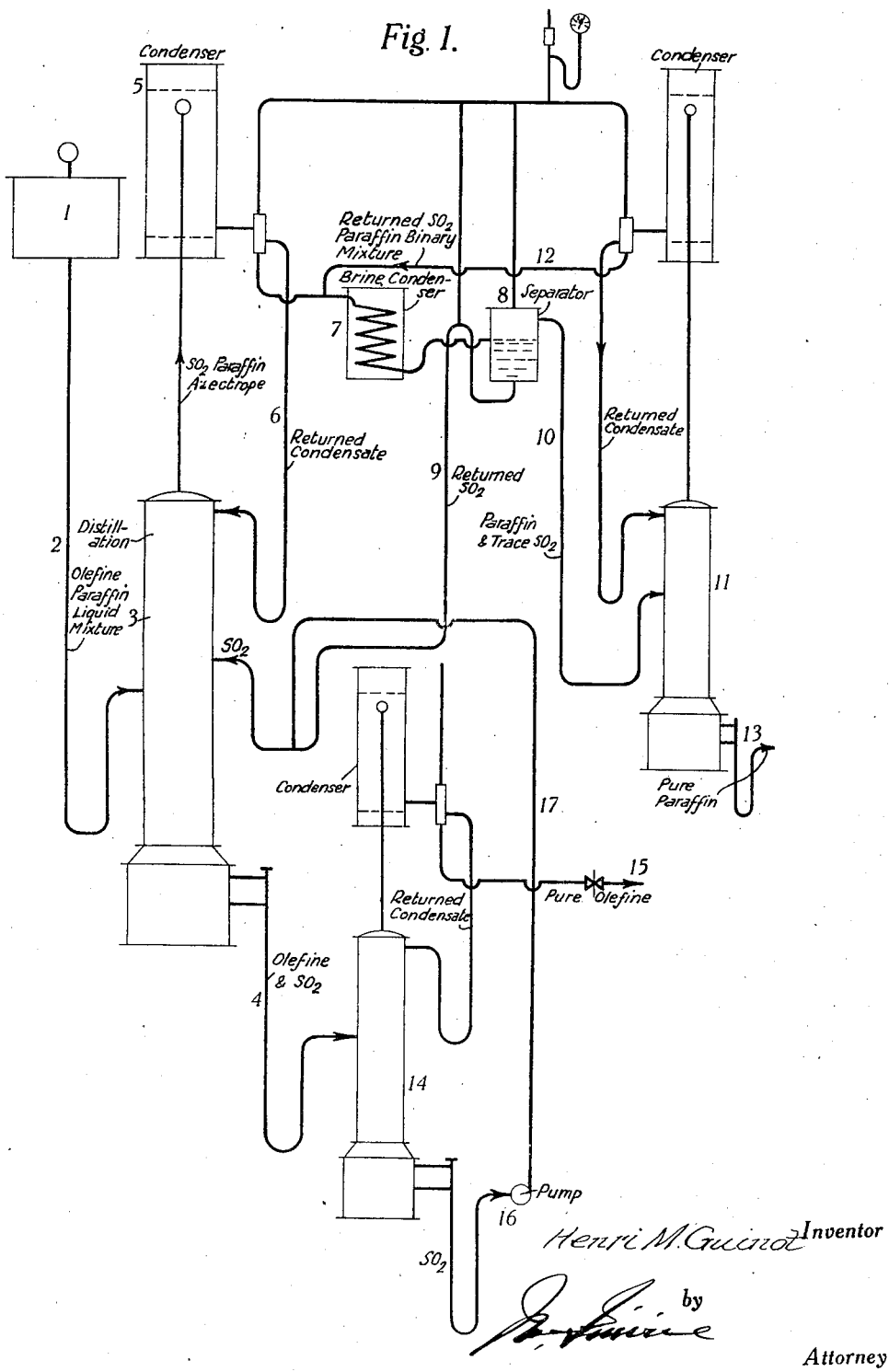

Patented Apr. 20, 1943

2,316,860

UNITED STATES PATENT OFFICE 2,316,860

SEPARATION OF MIXTURES OF OLEFINS AND PARAFFINS

Henri Martin Guinot, Niort, Deux-Sevres, France; vested in the Alien Property Custodian Application February 20, 1939, Serial No. 257,539
In France March 25, 1938

1 Claim. (Cl. 202—42)

It is known that it is practically impossible to separate the olefinic hydrocarbons from the corresponding paraffins by simple distillation because the boiling points of these substances are very close together. Thus propane, which boils —44°, and propene, the boiling point of which is —47°, cannot be separated by ordinary means.

Now it has been found that the separation of such olefin-paraffin mixtures may be achieved by carrying out the distillation in the presence of sulphur dioxide, maintained in the liquid state by the establishment of a convenient temperature. For example, returning to the consideration of the particular substances mentioned above, it has been found that if a certain quantity of liquified sulphur dioxide is added to a mixture of propane and propene in liquid form, and the whole mixture is boiled, the vapours evolved are rich in sulphur dioxide and in propane but practically free from propene. If a careful distillation is carried out the removal of all of the propane contained in the initial mixture is achieved, the liquid residue being exclusively constituted by sulphur dioxide and pure propene.

A similar result would be obtained if the distillation were carried out under pressure, instead of treating the liquified gases under atmospheric pressure.

These observations are explained by the fact that the propane and the sulphur dioxide give, at all pressures, an azeotropic mixture which, under the pressure of 7 kg. per cm.$^2$ for example, contains about 22% of sulphur dioxide and which tends to behave as a head product. Propene on the contrary does not form an azeotropic mixture with liquid sulphur dioxide, with which however, it is miscible in all proportions, even at a low temperature. Liquid sulphur dioxide retains propene strongly, whereas the mixtures of propane and sulphur dioxide separate into two layers.

The present invention therefore consists in a process for the separation of mixtures of olefins and paraffins in which the olefin-paraffin mixture is distilled in the presence of liquid sulphur dioxide.

From an industrial point of view there would be a great advantage in using a continuous mode of operation (although the discontinuous method is practicable). Continuous operation may be effected by sending the hydrocarbon mixture to be separated into the central portion of a column with plates which preferably works under superatmospheric pressure. At the feed level, or preferably a little above, the liquid sulphur dioxide is introduced, while slight heating is provided at the base of the column.

The olefin is absorbed by the sulphur dioxide whereas the paraffin escapes at the upper part, mixed with the sulphur dioxide in the form of an azeotropic mixture rich in hydrocarbon (approximately 78% under a pressure of 7 kgs. in the case of propene). After condensation this azeotropic mixture is sent to another column working under pressure where it is treated with water, in the upper part thereof. By slightly heating the base of the column, the paraffin, only slightly soluble in water, is removed by distillation, whereas the sulphur dioxide, miscible with the water in all proportions and much less volatile than the hydrocarbon, is obtained at the base in the form of an aqueous solution; it is recovered by simple distillation from the aqueous solution and is returned to the circuit.

This treatment can be simplified by making the paraffin-SO$_2$ azeotropic mixture separate into two layers by decantation and by continuously returning the lower layer of sulphur dioxide to the principal column. As for the upper layer formed of paraffin containing a little SO$_2$ in solution, it is freed from this latter by simple boiling, which leaves the pure paraffin as a residue.

Whatever the manner of treatment of the binary paraffin-SO$_2$ mixture may be, there is obtained at the base of the first column a liquid mixture of sulphur dioxide and olefin which is separated into its constituents by simple rectification, the olefin being obtained as the most volatile product.

The following examples, given in connection with the accompanying diagrammatic drawings, illustrate how the invention may be carried into practice.

`Example 1`

A mixture of propane and propene, originating for example from the rectification of cracking gas, and contained in the tank I (Fig. 1) is sent, in the liquid state, by the pipe 2, into the central portion of a distillation column 3 which is heated at the base and the plates of which are provided with liquid sulphur dioxide. The entire apparatus functions under a pressure of about 7 atm.

The vapours which rise in the column become progressively richer in propane. When they arrive at the top they possess the composition of the propane-SO$_2$ azeotropic mixture having 78% of propane and including no more than traces of propene.

On the contrary, the liquid which refluxes from plate to plate becomes progressively poorer in propane under the combined action of heat and the liquid sulphur dioxide in the lower half of the column, so that there flows away at the base of the column through the pipe 4, a liquid mixture of propene and sulphur dioxide.

The vapours obtained from the top of the column are condensed in 5. One part of the liquid thus formed is returned directly by the pipe 6 to the top of the column in order to insure the necessary reflux for the concentrating on the plates. The other part, corresponding to the quantity of propane to be withdrawn from the circuit, is cooled to about —8° in a brine condenser 7 and then sent to a separator 8 where the mixture separates in two layers, the lower layer, which is sulphur dioxide in an almost pure state is returned to the central portion of the principal column by the pipe 9; the upper layer which is propane having a little sulphur dioxide in solution, is sent through the pipe 10 into the central portion of a column 11 which is heated at the base and from the head of which is received the sulphurous acid in the form of a binary (i. e. azeotropic) mixture which is returned to the brine refrigerant 7 by the pipe 12, whereas pure propane flows from the base and is obtained at 13.

The liquid mixture of propene and sulphur dioxide which flows away at the base of the principal column 3, is sent to a second small auxiliary column 14. The propene and the sulphur dioxide do not form an azeotropic mixture together, and their separation is easily effected in the order of their volatilities; propene is obtained at the head of column 14 and it is removed from the apparatus in the pure state by the pipe 15. At the base of column 14 the sulphur dioxide is obtained, and it is returned to the manufacturing cycle by means of the pump 16 by the tube 17 and 9.

*Example 2*

Figure 2:
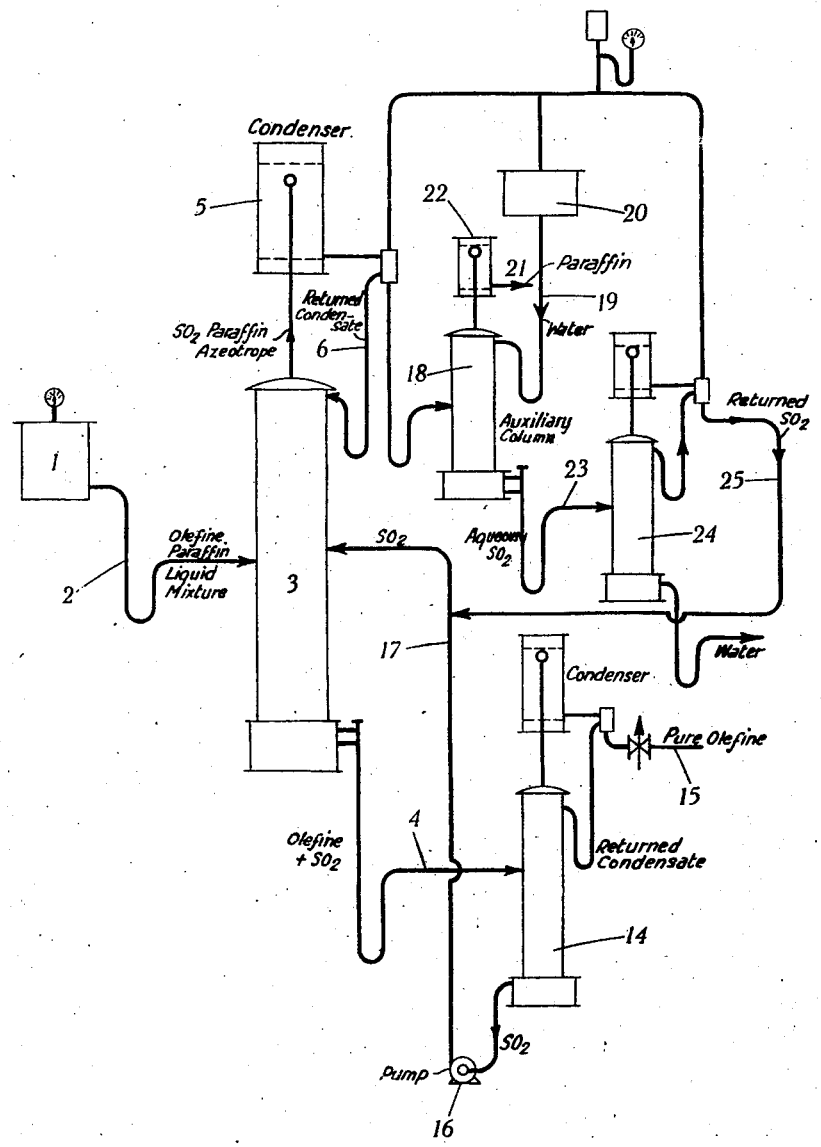

The distillation of the mixture is carried out in the presence of $SO_2$ as in Example 1 but instead of cooling the azeotropic mixture and allowing it to separate it is sent, directly it leaves the outlet of the condenser 5 (Fig. 2), to the central part of a small auxiliary column 18 which receives at its head through the tube 19, a shower of pure water coming from the tank 20. The water descending from plate to plate dissolves the sulphur dioxide and entrains it rapidly towards the lower part of the column. The propane, however, which is insoluble in water and the boiling point of which is much lower than that of water, is vaporised alone in the column. It arrives at the head of this latter in the pure state, from whence it is withdrawn through 21 after condensation in 22.

The aqueous solution of sulphur dioxide which flows away from the base of the small column 18 through the pipe 23, is separated into its constituents, by simple distillation in a second small column 24; the sulphur dioxide thus recovered being returned to the principal column by the pipes 25 and 17.

The treatment of the mixture of sulphur dioxide and propene obtained at the base of the column 3 is effected as in Example 1.

The process of the present invention is also particularly applicable to mixtures of ethane and ethene.

It is to be noted that the process and apparatus above described are operative in the case of these olefins which, at any given pressure, have a boiling point above that of sulphur dioxide. When treating such olefins in the manner indicated above the only difference will be that in the olefin-$SO_2$ separation column (column 14 in the drawings), the sulphur dioxide will be obtained as a head product, whereas the pure olefin will be obtained from the base of the column.

What I claim is:

A process for the separation of a mixture of olefins and paraffins, which comprises introducing said mixture in liquid condition to near the central portion of a first distillation column provided with plates, introducing sulphur dioxide into said column at a point slightly above the point of introduction of said mixture, applying heat to the base of said column, condensing the paraffin-sulphur dioxide azeotropic mixture thus obtained, introducing said azeotropic mixture to near the central part of a first auxiliary column, showering water through said first auxiliary column, applying heat to base of said first auxiliary column to obtain pure paraffin as a head product and aqueous sulphur dioxide as a tail product, introducing said aqueous sulphur dioxide to near the central part of a second auxiliary column, distilling said aqueous sulphur dioxide within said second auxiliary column to obtain sulphur dioxide as a head product, returning said sulphur dioxide to said first distillation column, removing said olefin as an olefin-sulphur dioxide mixture from the foot of said first distillation column, introducing said mixture to near the centre of a third auxiliary column, applying heat to the base of the said third auxiliary column, obtaining pure olefin as a head product and obtaining sulphur dioxide as a tail product and returning said sulphur dioxide to said first distillation column.

HENRI MARTIN GUINOT.